No. 728,643. PATENTED MAY 19, 1903.
M. F. WILLIAMS.
MACHINE FOR HULLING AND BREAKING COTTON SEED.
APPLICATION FILED DEC. 17, 1901.
NO MODEL. 2 SHEETS—SHEET 1.
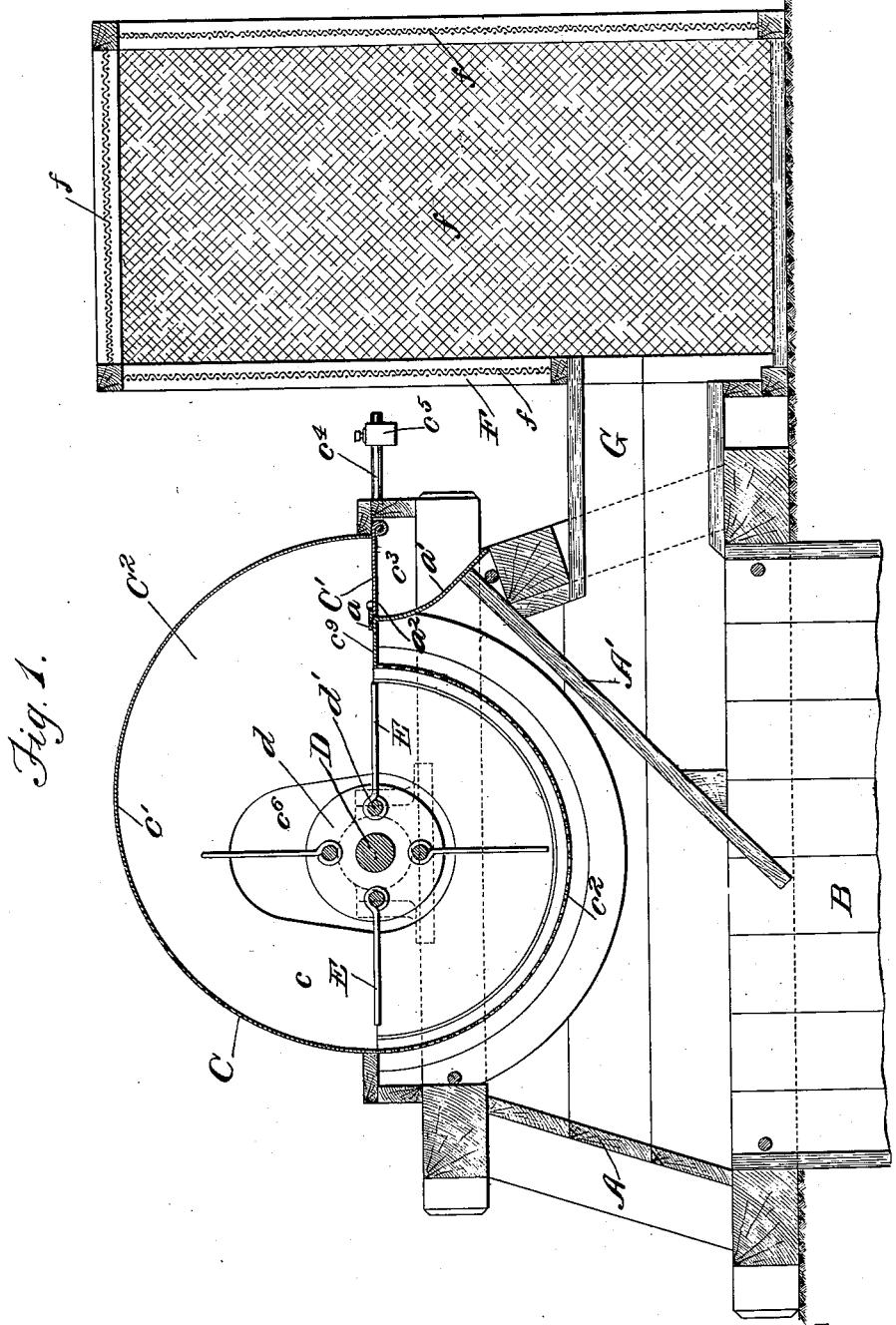
Witnesses.
O. A. Thelin
G. A. Pennington
Inventor:
Milton F. Williams,
by Bakewell Cornwall
Attys.

No. 728,643. PATENTED MAY 19, 1903.
M. F. WILLIAMS.
MACHINE FOR HULLING AND BREAKING COTTON SEED.
APPLICATION FILED DEC. 17, 1901.
NO MODEL. 2 SHEETS—SHEET 2.
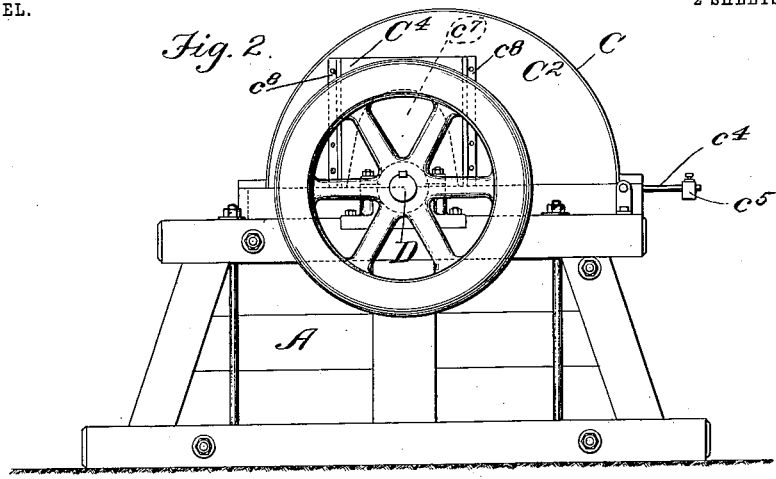
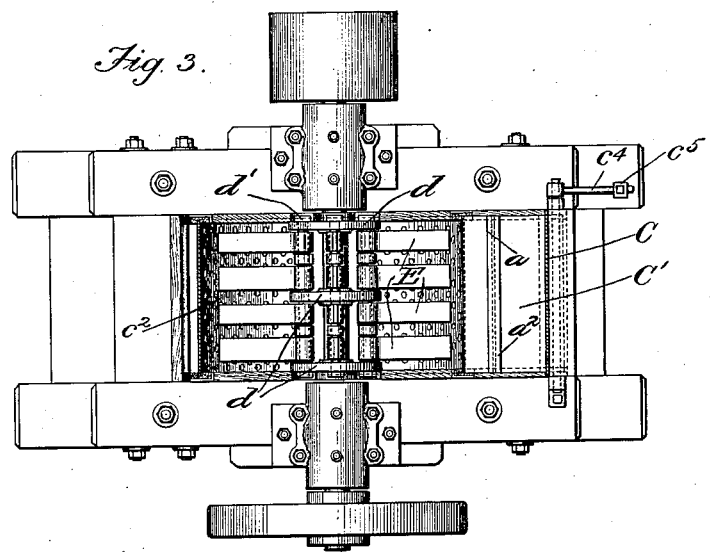
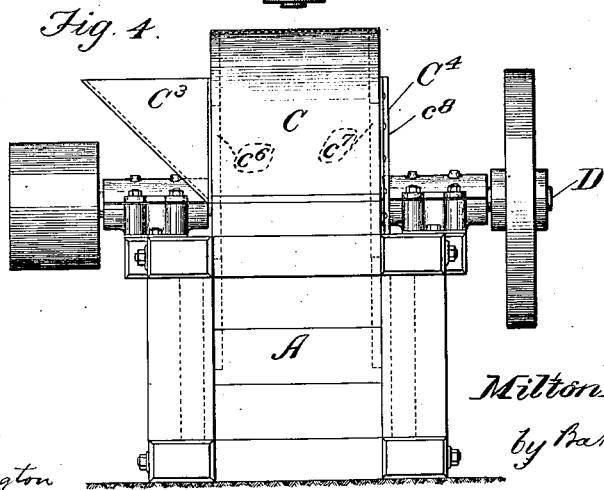
Witnesses:
O. A. Phelin.
G. A. Pennington.
Inventor:
Milton F. Williams,
by Bakewell & Cornwall
Attys.

No. 728,643. Patented May 19, 1903.

UNITED STATES PATENT OFFICE.

MILTON F. WILLIAMS, OF ST. LOUIS, MISSOURI, ASSIGNOR TO WILLIAMS PATENT CRUSHER & PULVERIZER COMPANY, OF ST. LOUIS, MISSOURI, A CORPORATION OF MISSOURI.

MACHINE FOR HULLING AND BREAKING COTTON-SEED.

SPECIFICATION forming part of Letters Patent No. 728,643, dated May 19, 1903.

Application filed December 17, 1901. Serial No. 86,251. (No model.)

*To all whom it may concern:*

Be it known that I, MILTON F. WILLIAMS, a citizen of the United States, residing at the city of St. Louis, State of Missouri, have invented a certain new and useful Improvement in Machines for Hulling and Breaking Cotton-Seed, of which the following is a full, clear, and exact description, such as will enable others skilled in the art to which it appertains to make and use the same, reference being had to the accompanying drawings, forming part of this specification, in which—

Figure 1 is a central sectional elevation. Fig. 2 is a side elevation. Fig. 3 is a top plan view, partly in section; and Fig. 4 is an end elevation.

My invention relates to machines for hulling and breaking cotton-seed and the like, my objects being to provide an apparatus of simple construction and operation by which the hulls are loosened from the seed, only material of a predetermined fineness is delivered from the apparatus, the lint which may be upon the seed when fed into the machine is separated and caught, easy passage of the operating blades or paddles is insured, and congestion in the operating-chamber is prevented notwithstanding the amount of material fed into the same.

To these ends and also to improve generally upon machines of the character indicated my invention consists in the various matters hereinafter described and claimed.

Referring now more particularly to the drawings, A represents the frame, which is open at its top and bottom and fits over a bin B or a chute leading to such a bin or any other suitable receptacle or place to which the hulled seed and the broken hulls are to be conveyed. Suitably supported upon said frame is a spiral casing C, which forms an operating-chamber $c$. The greater portion of the periphery of this casing is preferably formed by an integral casing-plate, the upper portion $c'$ of which is imperforate, while the lower portion $c^2$ of the plate is perforated to produce a screen. From the inner end of the spiral the casing-plate is bent outwardly and engages under a shoulder $a$ upon an upright $a'$ on the frame, a space being left between this upright and the outer end of the casing-plate, said space forming a discharge-opening $c^3$. A horizontal door $C'$, pivotally secured at the said outer end of the casing-plate, is connected to an outwardly-extending arm $c^4$, upon which is adjustably secured a weight $c^5$, which holds the door normally closed, with its inner end abutting under an outwardly-extending shoulder $a^2$ upon the said upright $a'$. End plates $C^2$ close the sides of the operating-chamber, and said plates are provided about the hereinafter-mentioned shaft with openings $c^6$ and $c^7$, from one of which openings extends the hopper $C^3$, while the other is provided with a gate $C^4$, slidable in guides $c^8$ on the end plate, said gate serving to close or to adjust the effective size of said opening.

Appropriately journaled upon the frame and extending across the operating-chamber is a shaft D, upon which are fixed supports $d$, and to these supports (as by means of through-bolts $d'$) are pivoted blades or beaters E.

A box F, having screen-walls $f$, is connected to the frame A (or to some other suitable point in the delivery-channel of the material from the before-mentioned operating-chamber) by a pipe G, and in the frame is a deflector-plate $A'$, which extends downwardly and inwardly across the receiving end of said pipe, an opening between the pipe and the channel traversed by the seed delivered from the operating-chamber being left below said deflector-plate.

Cotton-seed in the condition in which it comes from the gin is fed through the hopper into the operating-chamber and is struck by the rapidly-revolving beaters E, the hulls being loosened or torn from the seed and the seed and broken hulls of sufficient fineness falling or being forced through the apertures in the perforated casing portion. Those seed and hulls which are too large to pass through said apertures are broken by the beaters or are carried around by centrifugal action of said beaters, so that they are successively subjected to the beating or breaking action and brought over the screen until reduced sufficiently to pass through its openings. As before indicated, the casing is eccentric with respect to the beaters, and said beaters most nearly approach the screen at the end first approached by one of the beaters in its revolution, the said end being that from which the casing-plate is bent outwardly to engage the shoulder $a$. Thus the space between the screen and the line described by the outer end of the beaters gradually widens in the direction of rotation of the beaters, and the material acted upon therefore does not clog between the beaters and the screen. The outwardly-turned end $c^9$ of the casing-plate and the door $C'$ form a shelf upon which material is deposited by the beaters in their rotary action, said material banking upon the shelf and then falling into the path of the beaters to be further acted upon by them. The weight $c^5$ being properly set, however, the door will open when any predetermined amount of material is thrown upon it, and thus congestion in the operating-chamber is prevented notwithstanding the amount of material fed into the same. Furthermore, if the feed is nicely proportioned to the output of the machine practically only those seed or other articles which cannot pass through the screen-openings will lodge upon the door, and thus these "tailings" will be automatically delivered from the operating-chamber.

Cotton-seed as it leaves the gin generally has a certain amount of lint left upon it. The beaters tear or otherwise separate this lint from the seed, and it passes with the other material through the openings in the casing-screen. The opening $c^7$ in the end plate of the casing being suitably uncovered, the rapidly-revolving beaters act as fan-blades, and air is drawn in through said opening and forced out through the casing-screen with the material which has been acted upon by the beaters. Thence the air-current is through the pipe G and into the screen-box F, the air carrying the lint and depositing it upon the screens $f$, from which it can be collected in any suitable manner. Manifestly the intensity of the air-current, and consequently the fineness of the lint carried thereby against the screens $f$, can be regulated by the gate $C^4$.

I am aware that many minor changes in the construction, arrangement, and combination of the several parts of my device can be made and substituted for those herein shown and described without in the least departing from the nature and principle of my invention.

Having thus described my invention, what I claim as new, and desire to secure by Letters Patent, is—

1. In a machine of the character indicated, an operating-chamber having a discharge-opening therefrom, grinding members in said chamber, a door upon which said material is thrown by said grinding members, said door closing said opening and forming a shelf, and means whereby said door is caused to open by material delivered thereupon; substantially as described.

2. In a machine of the character indicated, an operating-chamber having a discharge-opening therefrom, rotatable grinding members in said chamber, a door upon which the material is thrown by said grinding members, said door closing said opening and forming a shelf, and means for yieldingly holding said door closed against the weight of the material supported thereby, whereby the door can be opened by the weight of its supported material and is automatically returned to closed position; substantially as described.

3. In a machine of the character indicated, an operating-chamber having a spiral peripheral wall, an outwardly-opening door forming a shelf between the ends of the spiral, and a rotatable beater within said chamber; substantially as described.

4. In a machine of the character indicated, a frame, an operating-chamber having a spiral peripheral wall, a plate on said frame and extending into the space between the ends of the spiral, oppositely-extending shoulders on said plate, a plate connected to the inner end of said chamber-wall and extending outwardly under one of said shoulders, a suitably-pivoted door spanning the space between the other of said shoulders and the outer end of the spiral and having its free end resting under said shoulder, said door forming a shelf, means for yieldingly holding said door closed, and a rotatable beater in said chamber; substantially as described.

5. In an apparatus of the character indicated, a casing containing means for operating upon the seed and having a discharge through which the reduced material is delivered, a deflector below said discharge, the reduced material being delivered upon one side of said deflector, and a lint-pipe upon the other side of said deflector and communicating around the lower end of said deflector with the space into which the reduced material falls after leaving said casing; substantially as described.

In testimony whereof I hereunto affix my signature, in the presence of two witnesses, this 13th day of December, 1901.

MILTON F. WILLIAMS.

Witnesses:
F. R. CORNWALL,
GEORGE BAKEWELL.